Aug. 25, 1936.  W. H. LEDBETTER  2,052,097
TRACTOR WHEEL
Filed Oct. 4, 1932   4 Sheets-Sheet 1
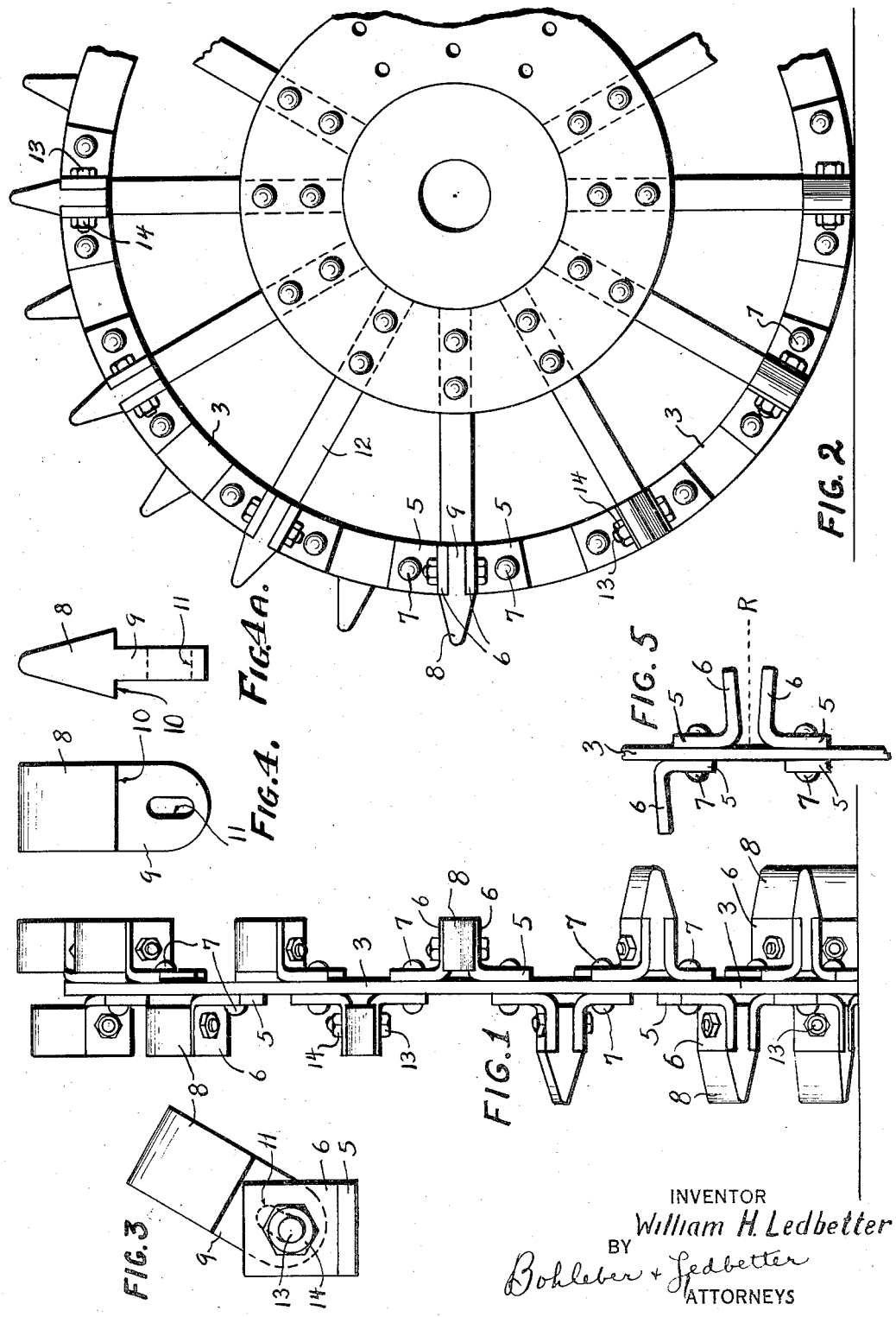
INVENTOR
*William H. Ledbetter*
BY
*Bohleber & Ledbetter*
ATTORNEYS Aug. 25, 1936.  W. H. LEDBETTER  2,052,097
TRACTOR WHEEL
Filed Oct. 4, 1932  4 Sheets-Sheet 2
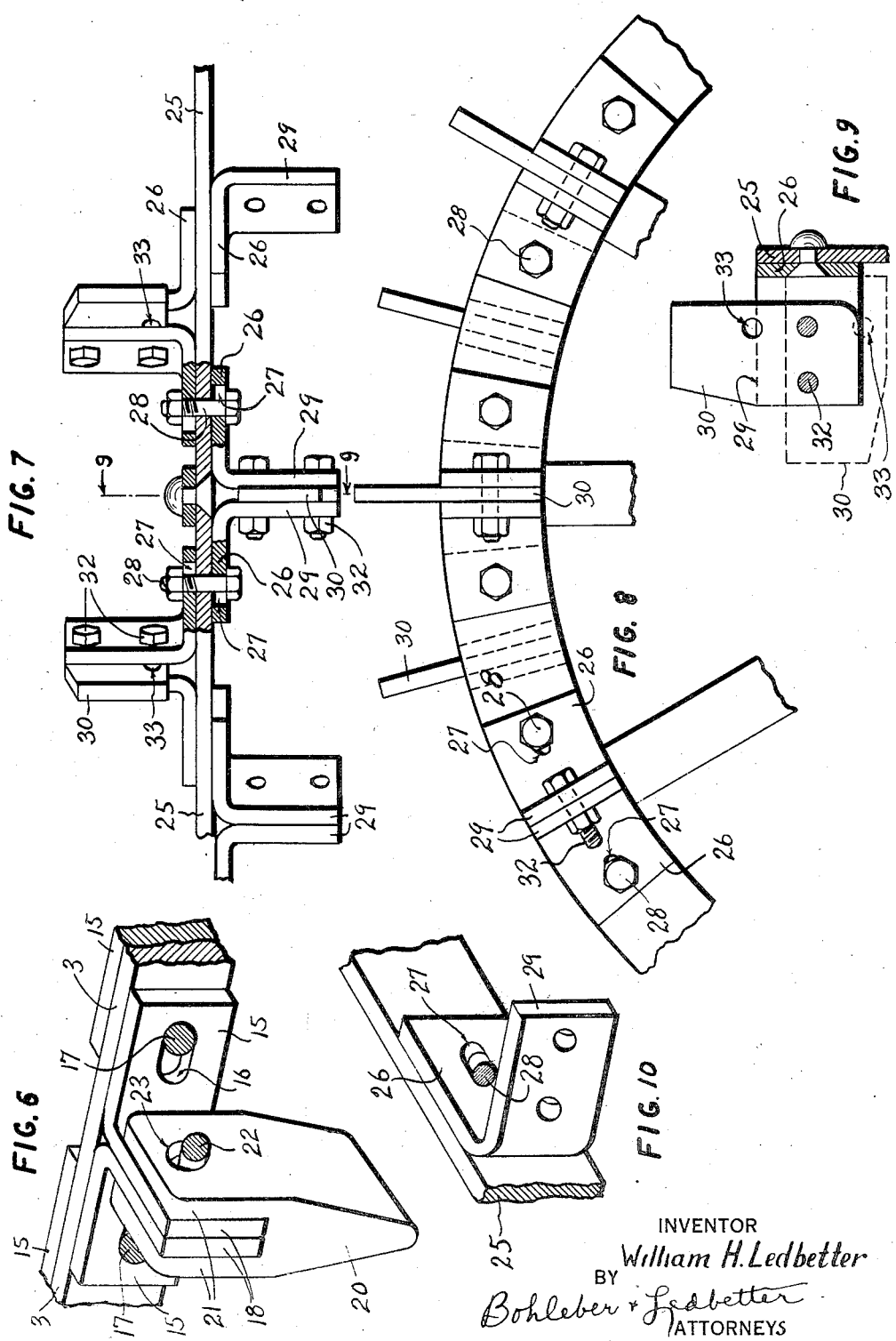
INVENTOR
*William H. Ledbetter*
BY
*Bohleber + Ledbetter*
ATTORNEYS

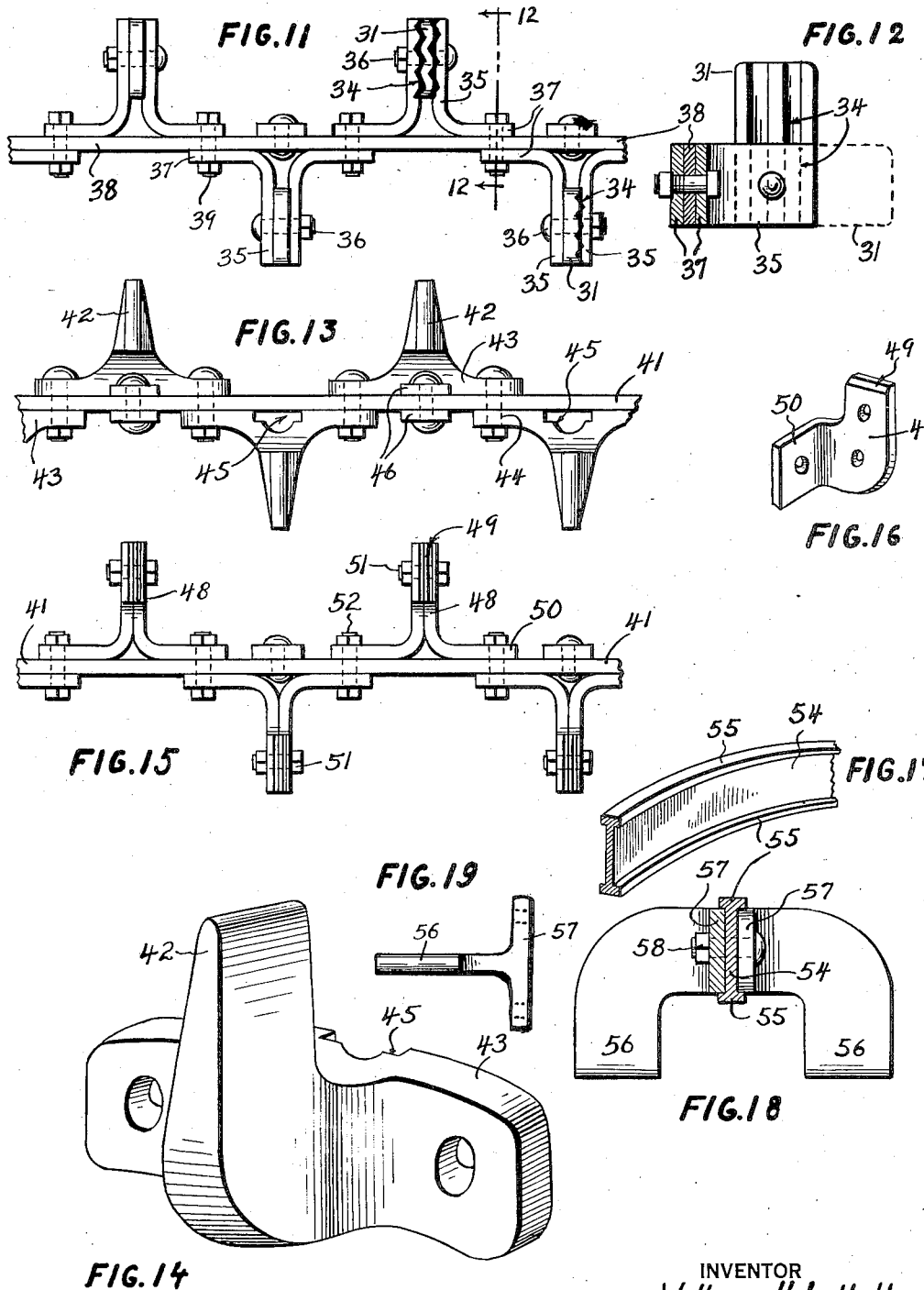

Aug. 25, 1936.    W. H. LEDBETTER    2,052,097
TRACTOR WHEEL
Filed Oct. 4, 1932    4 Sheets-Sheet 4
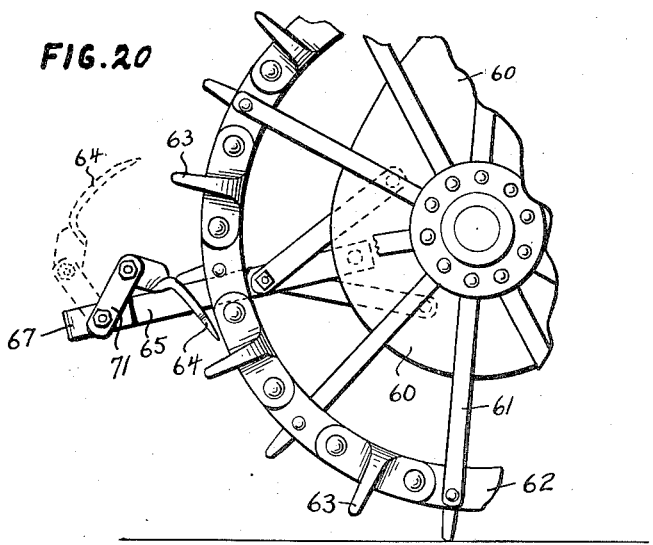
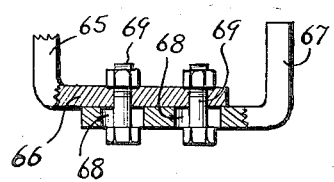
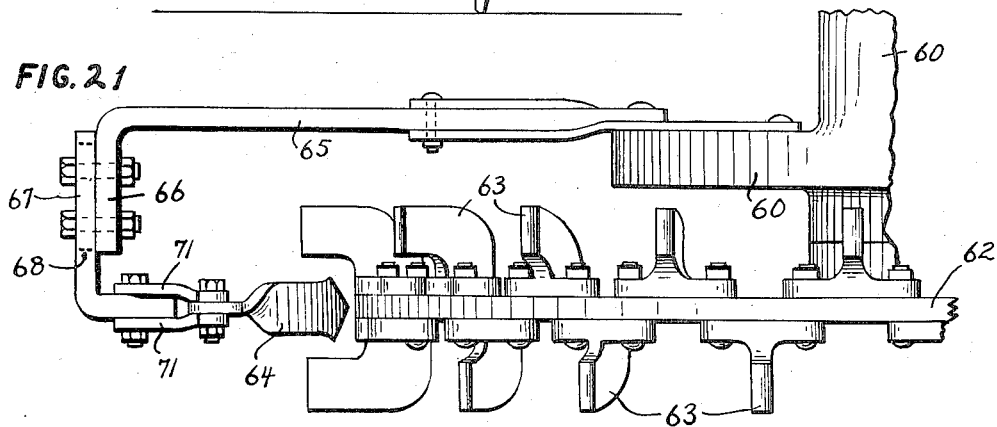
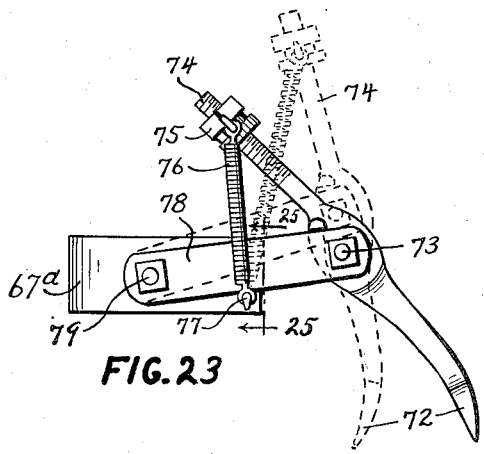
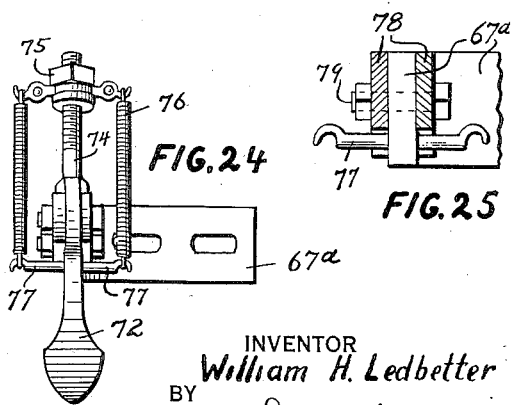
INVENTOR
William H. Ledbetter
BY Bohleber & Ledbetter
ATTORNEYS Patented Aug. 25, 1936

2,052,097

UNITED STATES PATENT OFFICE 2,052,097

TRACTOR WHEEL

William H. Ledbetter, Dallas, Tex.

Application October 4, 1932, Serial No. 636,193

4 Claims. (Cl. 301—50)

This invention relates to wheels used on farm tractors and the like and which provide effective traction for pulling heavy loads and possess novel features of adjustment to afford a variety of uses.

An object of the invention is to produce a tractor wheel having improved ground traction tooth or lug means capable of being adjusted as to position on the wheel rim to adapt the wheel to work in the field and soft earth in connection with earth tilling operations and the like where great tractive effort is required, and thereafter quickly reset or adjusted to adapt the wheel to run on roads or other hard surfaces without damaging same.

A further object is to produce a tractor wheel which is free of the usual choking and filling up with earth and trash, and avoids packing and pressing the soil, the ground traction teeth or lugs of which aid in pulverizing and conditioning the soil.

Furthermore, it is an object to produce a tractor wheel with positive non-slipping teeth so formed and related to the rim or tread of the wheel that there exists little tendency to collect trash or clog up with sticky soil by reason of the open straddling teeth which afford little or no means of collecting earth and trash on its tread.

More particularly, it is an important object to produce a tractor wheel having spreading or sidewardly disposed teeth which straddle, so to speak, and reach beyond the rim, characterized by a new combination tooth mounting means, the latter feature of which embodies tiltable or pivoting adjustment means, whereof the teeth may be tilted about an axis which is parallel to the plane of the wheel, and around which axis the teeth are set and reset into and out of operative position for field or road travel.

An important object of this invention is to produce a tractor wheel having a narrow bar stock edgewise tread carrying ground teeth or lugs which are susceptible to being cleaned. I have produced a combination toothed wheel means having novel ground gripping teeth to admit of the use of a wheel cleaner or scraper which heretofore could not be used on tractor wheels because of the projecting lugs which would not admit of a dirt and trash scraper being disposed in working proximity to the wheel rim.

A further object is to produce several forms of adjustable teeth and rim construction capable of carrying out these purposes, and others which will be apparent as the description of my invention proceeds.

In the accompanying drawings, there are shown several concrete examples of the invention. Changes in form, adjustment and use may be made without departing from the principles involved, as portrayed in the views as follows:

What may be termed the first form of the invention is shown in Figures 1 thru 5 featuring my tilt-out-traction or ground lugs to afford an all purpose wheel capable of two primary uses, first for general field work with ground gripping teeth extended beyond or outside the wheel tread or periphery and second with the teeth tilted back behind, inside of, or flush with the wheel tread for transport service on the highways.

Figure 1 shows an end or edge view of the tractor wheel with the hub and spokes removed for clarity. The wheel is shown on a ground line with several of the teeth set or tilted out laterally for road travel (or they may be reversed to point back toward the center of the wheel for road travel), while the teeth on the upper part of the wheel are purposely shown adjusted or pointed radially outward beyond the wheel thread for traction service in soft earth, as in the field.

Figure 2 shows a side view of Figure 1 but with a conventional hub and spoke structure assembled in connection with the wheel rim and its tiltably adjusting teeth.

Figure 3 shows an end view of a ground tooth mounted between two jaw-like supporting brackets, the clamping bolt therefor having been loosened and the tooth tilted in a mid-position to illustrate the method of adjustment from one use as road travel, to the other, such as field work.

Figure 4 shows a view of one form of traction tooth adapted for use with the first and other forms of the invention.

Figure 4A shows a side view of the traction tooth shown in Figure 4.

Figure 5 diagrammatically illustrates a bracket jaw pair including clamps standing out from the wheel rim and bent away from each other at their outer ends so as to spring back from the tooth carried therebetween to free the latter when the clamp bolt is loosened and thus make it easy to tilt the tooth into either position of use.

A second form of the invention is shown in Figure 6 which is a perspective view of a forked type of cast or forged slip-on or slip-over tooth having similar principles of adjustment and use as heretofore mentioned. A fragment of the wheel rim is shown carrying this adjustable lug.

A third form of the invention is shown in Figures 7 thru 10 which is characterized by a pair of double braced tooth supporting brackets adjustably carried on both sides of a wheel rim. This bracket pair is attached to the wheel rim in such a way that the ground traction lugs may either be loosened and removed from the wheel or simply tilted sidewardly from the rim so as to adapt it for road travel. Two clamp bolts are shown for anchoring each lug between the jaws.

Figure 7 shows a rim edge view of this third form of construction; and Figure 8 shows a side view thereof. These two views are projections, one from the other.

Figure 9 is a cross section on the line 9—9 of Figure 7 and shows one of the lugs tilted radially out beyond the wheel rim for traction use in the field or soft earth, and the tooth is tilted sidewardly from the rim tread, as in dotted line position, for road travel.

Figure 10 is a detail perspective view of one part of the double braced tooth supporting bracket or outstanding jaw means carried adjustably on one side of the wheel rim or tread.

A fourth form of construction is shown in Figures 11 and 12 which illustrate a corrugated lug or tooth construction and a single bolt for securing or anchoring the teeth in radial position for work requiring effective ground traction, and for lateral or sidewise adjustment, as in dotted lines, to adapt the wheel to run on the road.

Figure 11 is an edge view looking down on the wheel; and Figure 12 is a cross section on the line 12—12.

Fifth and sixth forms of construction are shown in Figures 13 thru 16, comprising non-adjustable but spraddling traction teeth, and this feature of the invention pertains to a one piece cast or forged tooth with integral rim bracket or shank and foot attached to the wheel rim. This construction is restricted to field use or heavy draft work.

Figure 13 is an edge view of the wheel, and Figure 14 is an enlarged perspective view of one tooth.

Figure 15 shows a rim tread edge view and Figure 16 a tooth fashioned from wrought iron or bar stock and which is also a one piece tooth construction.

A seventh form of construction is shown in Figures 17, 18 and 19 comprising a wheel rim and tooth combination having a braced or overlapped means attained by using an I-beam construction for one of the parts. Figure 17 shows a fragmentary portion of the wheel rim, Figure 18 a cross section through this form of the wheel, and Figure 19 is an edge view of the tooth.

There is shown in Figures 20 thru 25 a toothed wheel and rim cleaner combination, in effect a sub-combination, and comprising a toothed wheel having the radially directed spraddle lugs made in accordance with one or more of the forms of construction heretofore mentioned, together with a scraper for continuously cleaning the wheel in event unusually sticky and trashy ground is being worked.

Figure 20 shows a side view of the combination wheel and cleaner, while Figure 21 is a plan view thereof, enlarged.

Figure 22 is a detail in part section of adjustable bracket means to mount the wheel cleaner blade centrally of the teeth and in working relation with the wheel rim.

Figure 23 shows a side assembly view, and Figure 24 is a rear view of a spring trip scraper or cleaner which may be used with wheels made in accordance with my invention.

Figure 25 is a sectional view on the line 25—25 of Figure 23 showing spring hooks to hold the lower ends of springs which yieldingly hold the cleaner blade to the wheel rim.

The invention comprises, generally, an edgewise wheel rim means in the form of a ring on which is carried outstanding spraddle-like teeth which reach beyond the radius of the wheel rim or tread at a point spaced laterally or sidewardly from the wheel rim. Various advantages are derived from this type of wheel construction such as avoiding choking up in soft and sticky earth or trashy ground, and avoiding the packing of soil. Furthermore, this wheel aids in pulverizing the earth and may be driven along a hard surface or on the roads without damage thereto. Also it is novel in that a cleaner may be used.

Several species of wheel construction having adjustable teeth pivoted about an axis parallel to the plane of the wheel or its direction of travel and to one side of the wheel tread, by which the teeth may be tilted toward and from the wheel rim for the two positions of use, will now be described as coming within the principles of my invention.

*First form in Figures 1 thru 5*

A ring 3 forms the felloe and tread of the wheel and is made of bar stock set edgewise for radial strength and to present a narrow tread to the soft earth to enable the wheel to dig or cut into the ground and follow its teeth down into the earth to gain traction. The example shown comprises a single piece felloe ring forming one tread rim means, but other forms of construction may be employed. A single piece or continuous ring having smooth sides combines in a practical way with my improved ground teeth of adjustable and non-adjustable form.

A plurality of double braced tooth supporting brackets, constituting teeth or lug carrying jaws, are bolted or otherwise secured to the sides of the rim 3 and disposed flush with the tread edge thereof. These brackets may be made of the same bar stock as the tread rim 3 and are shown as angle or L-bar pieces, one portion of which may be designated as the rim attachment bracket or foot 5 in the form of a rim attachment plate, and the other portion thereof constitutes a bracket jaw 6. These members may be provided in pairs and are secured by bolts or rivets 7 in spaced relation and preferably overlap each other on each side of the tread rim 3. A pair of these brackets 5, 6 is employed to adjustably support a traction tooth or lug in its two positions.

The traction tooth or lug includes a point 8 and integral shank 9 with shoulders 10 adapted to seat against the outer edge of the clamp jaws 6 when the teeth are set radially outward beyond the rim 3 for field and heavy traction work. Each tooth is provided with a bolt hole of any suitable form made through its shank. In the illustrated example of my invention, there is provided an elongated opening 11 by which the tooth may shift or move relatively on its clamping bolt 13 between the clamp jaws 6. This elongated slip joint or adjustment hole 11 is made longitudinally of the traction tooth, but the hole can otherwise be made oversize or larger than the bolt received therethru to afford lost motion to facilitate adjustment or resetting the teeth from one position to another. The tooth portions 8 and 9 are made narrower than the length of the projecting jaw brackets 6 and carried at the outer end of said brackets so that a peripheral space is left between the teeth.

In assembling the wheel, the double braced tooth supporting brackets or foot pieces 5 are placed back to back, as shown, one on each side of the smooth surface rim 3. This disposes the ring or rim 3 in the center of the wheel structure and thus positions a pair of brackets 5 in overlapping relation so that one rivet or bolt 7 secures two brackets in place on the wheel rim 3. This arrangement provides circumferentially and equi-distantly spaced bracket pairs 5 on one side of the rim with opposite bracket pairs 5 carried on the other side of the rim in similarly spaced relation but between the first brackets. In other words, the bracket pairs 5 are disposed in staggered relation along each side of the wheel rim 3. The construction as explained reduces the number of rivets 7 and reinforces the wheel ring or rim 3 comprising the wheel tread.

The tooth shank 9 is inserted between each clamp jaw pair 6 and a bolt 13 is passed through the jaw clamps 6 and lug slot 11, whereupon a nut 14 is screwed tightly on the bolt. This bolt 13 is disposed parallel to and spaced sidewise from the rim 3. Thus the clamp bolt 13 positively anchors the tooth 8 onto the wheel. The two shoulders 10 of each lug seat on the outer edges of the outstanding bracket jaws 6 and thus take the working stress and fix the lug against rotation on the bolt 13. Hence only one bolt is required to hold the tooth in either position shown, i. e., inside or outside the wheel tread. The jaws 6 and coacting shoulders 10 produce a rugged construction and engage to hold the teeth sidewardly as at the lower part of Figure 1 and outwardly as at the top of the view.

In some forms of the wheel construction, it is desirable to forge or fashion the lug carrying bracket jaws 5, 6 into that form shown in Figure 5 where the dotted line R represents the perpendicular or right angular projection from the wheel rim 3, and each jaw 6 is disposed at an angle thereto with its outer end bent away from the perpendicular. Hence the jaws are made on an angle a few degrees less than a right angle in relation to their bracket or rim abutment foot end pieces 5. This means that the outer ends of the two spaced jaws 6 inherently spring away from each other and tend to open up the space provided for the tooth shank 9. The bar stock material, from which the bracket parts 5, 6 are manufactured, is sufficiently flexible as to permit the jaw ends 6 to yield outwardly away from each other and free the tooth shanks 9 when the clamp bolts 13 are loosened. When the teeth 8 are mounted between the angular non-engaging jaws 6, it follows that they are easily tilted into any desired position so long as the bolts and nuts 13, 14 are loose. Tightening of the bolts and nuts 13, 14 draws the jaws 6 up against the tooth shanks 9 under their shoulders 10 and thus fixes or restrains the tooth against displacement. Each shoulder 10 on each tooth 8 and the two flat surfaces upon the bracket, one of which is engaged by each shoulder in each of its two positions, constitute interengaging means to secure or restrain movement of the tooth.

The wheel construction above described, like other forms of my invention, is adapted for two uses by simple adjustment of the lugs. By setting and locking the lugs 8 in outward position radially beyond the rim tread 3, as shown in the upper portion of Figures 1 and 2, the wheel is made ready for soft ground work in the field and for plowing operations. It is then a simple matter to loosen the bolts 13 which allows the jaws 6 to spring apart, as in Figure 5 and free the teeth, and then tilt or adjust said teeth outwardly as shown at the bottom of Figures 1 and 2 so the lugs lie laterally within the wheel tread circumference, or at right angles to the plane of the rim 3 whereupon the wheel is now ready for travel on hard surfaces, such as on roads or highways. The farmer can readily use the tractor for transport work without damaging the roads and can cross a road from one field to another without undue loss of time.

As to the spoke 12 and hub structure, it will be understood that the outer spoke ends are bolted, riveted or welded to the wheel ring or rim 3 at any convenient place. Likewise other parts in the wheel assembly can be welded or made integral if desired but replacement or repair is facilitated by using bolt or rivet anchorage means.

A description will now be given of certain modifications in the lug and supporting brackets wherein the member 5, 6 may be altered in its construction to carry a forked slip-on tooth, and reference is made to Figure 6.

Second form in Figure 6

This form of construction provides a modified tooth and bracket supporting means likewise embodied in my invention, and accordingly the wheel rim or ring in Figure 6 is also designated by the reference character 3, as in the first form. This in reality pertains to a forked shank in the form of a slip-on or slip-over tilting tooth, as an alternate type, which may be preferred in some cases over the other tooth design shown in previous views and sometimes designated the slip-in teeth.

A pair of adjustable foot-piece brackets 15, with lengthwise slots 16, are adjustably anchored to the rim 3 by bolts 17. Each bracket 15 has an outwardly extending support bar 18 somewhat like the jaws 6 heretofore explained except that the slot and bolt means 16, 17 permit the two members 18 to be brought together in flat abutting relation when the slip-on forked shank tooth of Figure 6 is to be used. On the other hand, in event a tooth similar to the one shown in Figure 4 is employed, the foot piece brackets 15 are separated to simulate jaws by loosening the bolts 17 and sliding the members 18 apart, whereupon a tooth, as at 8, is inserted between the jaws 18 the same as heretofore described in connection with the first form of construction.

I have provided, however, for the rim 3 and brackets 15, a novel type of tooth including a point 20 having spaced tines or fork means 21. This tooth 20, 21 is slipped on or over the closely adjusted tooth supports 18 and a clamp bolt 22 is inserted through the tooth ends 21 and sidewardly projecting supports 18 and thereupon tightened to clamp the parts together. Thus is provided a slip-on tooth adapted to be used on a wheel construction similar to the first form, as in Figures 1 thru 5, and I have attained this end by providing the slot means 16 in one of the parts either the foot piece or rim attachment bracket 15.

It is to be noted that an enlarged or slotted hole 23 is made thru the forked tooth 20 for the reception of the bolt 22. This affords lost motion of the tooth in relation to the support means 18 so the tooth may be tilted around the bolt 22 without removing said bolt from the wheel. Thus the tooth point 29 can be tilted about the outstanding members 18 and directed conveniently in or out in relation to the wheel rim 3. In either position the bottom of the fork rests on the edges of the outstanding support bar and the strain is relieved from the bolt when the tooth is forced into the ground.

Third form in Figures 7 thru 10

In this form of the invention there is provided adjustable bracket jaws for mounting the traction lugs in extended position beyond the wheel rim and it is unique in the adjustment of the jaws for different thickness of teeth or to remove the teeth entirely and then bring the jaws together so the wheel may be used on the road.

Accordingly, a wheel rim or ring 25 is provided the same as heretofore, and bracket pairs 26 have slots 27 through which clamp bolts 28 are inserted to adjustably attach the brackets 26 to the wheel ring 25. The brackets 26 are turned outwardly at right angles, or approximately so, to the rim attachment foot plates or brackets 26 and hence at right angles to the wheel rim 25 to provide lug retaining jaws 29 which are adjustably spaced apart to receive a lug or tooth 30 of any desired form and thickness.

A variety of different size or shape ground lugs or teeth 30 may be used between the adjustable jaws 29. For example, it may be desirable to employ a thick tooth at one time and a thin tooth at another due to different soil conditions, and this is readily accomplished by reason of the adjustment slots 27. The clamp bolts 28 are loosened and the proper size and thickness of lug 30 is inserted with bolts 32 passed through the lugs 30 and jaws 29 and then tightened up to secure the tooth 30 in place. Thereafter the rim bracket clamp bolts 28 are tightened and the whole assembly is made rigid and complete ready for work. The teeth 30 are preferably narrower than the length of their projecting support jaws 29 and thus is left a space between the teeth and rim 25.

Referring to Figures 7 and 8, it is noted more particularly, at the left in both views, that the tooth 30 may be entirely detached from the wheel to make ready for use on the roads. In this latter use, the jaws 29 are brought closely together so as to abut each other and avoid damage thereto while rolling on a hard surface. While two lug bolts 32 are shown to clamp the jaws 29 in double braced and abutting position, it is understood that one or more bolts may be used, depending upon the size of the parts and the wheel construction in general. All the ground lugs 30 may be detached from the wheel and the lug jaws 29 brought together in snug relation with all bolts 28 and 32 tightened up to produce a flush tread type of traction wheel for use in soft earth where minimum or light traction only is needed and which is gained by reason of the rim 25 and its flush jaws 29 acting as teeth by sinking into the earth. In other words, the jaws 29 are in effect ground gripping teeth and will sink into the earth by reason of the relatively thin edges which they present with the thin rim 25. This type of wheel provides adequate traction for certain classes of field work where the earth is soft and the extra traction to be gained by the deeper piercing teeth 30 may not be required.

In Figure 9 the method of tooth adjustment in this form of the invention is more fully illustrated. It is noted that the outside bolt 32, parallel to the plane in which the wheel rolls, may be removed and the tooth 30 tilted at right angles to the wheel plane and down to the left into dotted line position, whereupon the bolt 32 is then inserted through a third bolt hole 33 to lock the tooth 30 in its retracted dotted line position so that the wheel can be used on the road and the teeth 30 left on the wheel instead of being removed, as first explained. The teeth 30 are therefore punched with the several bolt holes, the hole at 33 being employed to hold the tooth out of operative position within or sidewardly of the tread line.

Fourth form in Figures 11 and 12

In this type of construction, I employ a ground lug or tooth 31 corrugated at 34 in part or whole, i. e., from one end of the tooth to the other, or along a portion of its length. The corrugations 34 may be forged into one end only of the tooth and lie between similarly corrugated clamp jaws 35 and anchored there by a bolt 36. The corrugations 34 may be made longitudinally or transversely of the tooth 31 as desired and the inner faces of the jaws 35 are similarly corrugated at 34 to register with the corrugated surfaces of the lug 31.

One or both sides of the tooth may be corrugated. A variety of modifications may be resorted to in this connection, and these views are shown to illustrate the principle underlying this feature of the invention. The corrugated jaws 35 are integral with the rim brackets 37 and the latter are anchored to the wheel rim 38 by bolts 39 in the usual way. The corrugations afford a well braced tooth and bracket support construction and, upon loosening the bolt 36, the jaws 35 spring apart so that the tooth 31 can be readily adjusted by hand to the dotted line position and out of operative contact with the ground, as heretofore explained in connection with Figure 5.

Fifth and sixth forms in Figures 13 thru 16

In this form of the invention, there is shown alternate types of ground lugs which may be cast or forged as in Figures 13 and 14 to produce a tooth integral with its rim attachment foot or base portion 43, or they may be fashioned from bar stock in halves and then secured together in one piece as in Figures 15 and 16.

An edgewise wheel rim 41 is shown in both modifications, Figures 13 and 15, and a one piece forged or cast lug tooth 42 is integrally formed with its shank and base or foot 43 and anchored to the rim 41 by one or more bolts or rivets 44. This cast tooth 42 may have a spoke receiving channel or groove 45 made therein and adapted to admit the outer end of a wheel spoke 46 which is anchored to the rim by welding, or rivets, and in other instances by bolts, although, on the other hand, the rim 41 may carry a bar stock one-piece tooth 48 with integral foot bracket 50, as shown in Figures 15 and 16, and sharpened at 49. The tooth 48 is perforated in its blade to receive a rivet, bolt or bolts 51 to anchor two teeth 48 together to reinforce and double brace and strengthen them and produce a multiply tooth blade. Likewise, rim bolts 52 are provided to mount the teeth 48 in working position on the rim. Both forms of teeth 42 and 48 arch laterally out and beyond the wheel rim, thus providing the characteristic wide open space between the teeth and around the wheel rim.

Seventh form in Figures 17, 18 and 19

In this type of construction there is employed an interlocking rim and tooth means wherein a rib, bead or lip is made or flanged over on one part or the other, say the rim or tooth, thereby forming a channel, by which to anchor the teeth on the rim with one bolt and brace and lock the teeth against tilting action by reason of the lip or channel construction.

As an example of this form of the invention, there is shown a wheel rim 54 made in the form of an I-beam having parallel ribs 55 in the nature of lips which are flanged from both radial surfaces of said rim and provided on one or both edges of the rim 54. In accordance with this conception, the rib or flange 55 may be made on either a tooth 56 or the rim 54.

The tooth 56 has a rim abutment bracket plate or foot 57, similar to those heretofore described, and a bolt or rivet 58 anchors the tooth to the rim 54 by clamping the flat bracket portion 57 between the I-beam flanges 55. Thus one bolt 58 may be employed to lock the tooth 57 against tilting action on the rim 54. The teeth 56 are easily removable to operate the wheel on hard roads by rolling on the rim tread 55.

Combination toothed wheel and cleaner

A characteristic of my several forms of wheel invention resides in the fact that a wheel cleaning blade or tooth-like scraper can be used in close proximity to the wheel rim and deep down between the arched and spreading or spraddling ground gripping teeth of alligator form.

In this connection there is shown a fragment of the rear axle and gear housing of a tractor machine at 60 on which one of my tractor wheels 61 is mounted. The wheel 61 embodies my characteristic single ring or rim 62 with straddling and outstanding teeth 63 made in accordance with one of the types of wheel construction heretofore discussed. The circumferentially spaced rows of teeth 63, one row on each side of the rim 62, leaves the heretofore described unique wide open and unobstructed space by which a wheel cleaning blade 64 may now be used to reach into and between the teeth and work close to or against the edgewise rim 62 to continuously dig away the soft sticky soil or cut out stalks or field debris, should any accumulate. Any suitable form of cleaner blade 64 may be employed and it is removable for sharpening or replacement after wear.

Any appropriate mounting means is used to support the cleaning blades 64 in service position and, as an example, there is shown a bar 65 braced from the tractor machine 60 and having a bracket end 66 bent toward the line of travel of the wheel 61. A sidewardly or laterally adjustable bracket 67 has slots 68 and bolts 69 to anchor the two brackets 66 and 67 together. Clamp straps 71 or other appropriate means carries the cleaner blade 64 in rigid position, adjusted to suit conditions, between the teeth 63. This cleaner has occasional use in abnormally trashy or sticky soil where the dirt and stalks may fail to fall away from the open central space defined between the arched teeth.

In Figures 23, 24 and 25 there is illustrated a spring trip cleaner blade 72 swingable on a pivot bolt 73 and having an upper threaded shank 74 carrying an adjustable threaded collar 75 screwed onto the shank to vary the tension on trip springs 76. One end of each spring is attached to a swivelled yoke embracing the threaded collar 75 and the other ends are attached to stationary hooks 77 which project from a bracket 67ª of the same form as the lateral adjustment bracket 67 heretofore described. A tiltable reach bracket 78 is pivoted at 79 on the adjustable support bracket 67ª. Should the debris and dirt clog up between the teeth, or a hard obstruction lodge therein, the springs 76 will yield and permit the cleaner 72 to automatically kick back, as shown in dotted lines, so as to avoid damaging the blade.

General principles and characteristic uses

The several forms of tractor wheels described present a variety of structures and afford a wide selection, are similar in principle, and have lugs or teeth of bladed or axe-like formation and are spaced laterally sidewise or axially away from the wheel rim in such fashion as to present ground-surface traction with straddle-like action, not unlike the locomotion of an alligator whose feet are spread apart to track parallel widely spaced courses and thus avoid clodding or bogging up in soft ground. This rim and tooth combination will be recognized as arching the ground teeth from the rim in that the rim is carried centrally of and far back in and away from the tip ends of the teeth. Hence the teeth arch or branch out laterally from and radially beyond the rim. Thus is produced a toothed tractor wheel adapted in combination with a cleaner.

This invention produces a wheel which tracks and works clean, and is non-choking due to the sharp lugs being disposed radially of the wheel axis and spaced wide apart circumferentially, and also laterally or axially spaced, and thus the spraddle lugs or teeth leave an open space outside the wheel rim and between the traction teeth. The wheel, therefore, avoids collecting field debris, comprising dead vegetation, stalks and roots because of the open and unobstructed space existing between the lugs which causes the trash to fall out and away from the wheel. The open spaces outside the wheel rim and between the spraddling ground teeth affords no structural means or parts to pick up and carry trash. In effect, there exists no structure in the plane of the wheel rim for collecting trash and dirt which otherwise and ordinarily packs and balls up on conventional types of wheels in general use.

This invention also affords a wheel which is non-packing, i. e., it cannot compress and harden the loose soil over which it rolls since the wheel travels with a free rim and non-choked teeth. Inasmuch as the wheel rim and teeth are not filled up with mud and dirt to form a packing rim or tread, it follows that the wheel rolls along without pressing the soil. In conventional or standard wheels having flat steel rims, the great weight of the tractor bears the flat rim heavily on the earth and packs the soil and deprives the ground of its natural ability to absorb and retain moisture to yield a normal plant growth. In the same way, conventional or standard wheels, having a lattice-type or open-web tread rims, also very promptly fill up with moist or sticky earth which adheres to the cross bars and web-type rim and thus in effect forms an earth rim as solid and hard as the novel type of flat steel rim and rolls on the soft plowed field with the same packing effect and results in the same harmful treatment to the pulverized earth.

It is noteworthy that the radially disposed lugs or teeth sink naturally into the earth and thus afford the traction so essential to satisfactory plowing and other field tilling, as well as for heavy draft work in general. Traction is thus positive and no slipping of the wheel occurs in the ground. Any tendency to slip acts to more deeply sink the lugs in the ground to effect greater tractive effort. As the wheel lugs dig in and come out of the earth, there is a natural prying effect which breaks and loosens the underneath or hardpan sub-surface soil which may have been packed and clodded by prior use of conventional solid rims or other forms of wheels. The deeply piercing axe-like teeth, therefore, have a loosening and pulverizing effect on the soil and positively split and break up the hardened sub-surface strata.

After use in the field or other draft work where the traction lugs or teeth are used in extended position for maximum traction, it requires a very short time to loosen the clamp bolts and free the teeth between the bracket jaws and tilt the teeth outward and back laterally of the wheel rim or reverse their direction, thus pointing them back toward the wheel axis. The several forms of tilt-out teeth are carried on the bolts or pivot pins the axis of which is placed to one side of the wheel and parallel to the direction of wheel travel. The wheels on the tractor are now ready for ordinary road travel and will roll along a hard surface without damaging it. This is a great practical advantage, saves the cost of providing and trying to keep conveniently at hand, as well as the labor of installing and removing, the demountable flat road rim of conventional design now in use to cover traction wheel lugs so the tractor machine may cross a highway or travel thereon. The tiltable or adjustable teeth of this invention affords a tilt-out lug wheel of marked simplicity having few parts, of light weight, and convenient in changing it from one use to another.

What is claimed is:

1. A tractor wheel, comprising in combination, a rim, bracket means standing out from the rim and being flush with the rim tread, ground teeth mounted on the bracket means, each tooth having a flat side face, and bolt means adjustably securing each tooth to each bracket means to extend beyond the tread or axially outward from the rim with the flat side face thereof substantially flush with the tread, said bolt means being disposed parallel to the plane of the wheel rim, and interengaging means on each tooth and bracket means to secure each tooth against rotation upon its bracket means in axially extending position.

2. A tractor wheel, comprising in combination, a rim, bracket means projecting from the rim and being flush with the tread on said rim, said bracket means having a flat surfaced end, traction teeth, each tooth having a flat shoulder thereon and a flat side face, and means to secure the traction teeth to the bracket means to afford an adjustment of said teeth either radially to extend outside of the wheel tread or axially outward from the rim with the flat side face of each tooth substantially flush with the tread and each shoulder engaging the flat surfaced end of the bracket.

3. A tractor wheel, comprising in combination, a rim, bracket means standing out axially from the rim and being flush with the rim tread, a flat end on said bracket means, ground teeth, each tooth having a flat side face and being carried by the bracket means, bolt means adjustably securing each tooth to a bracket means by which to either adjustably extend said tooth radially beyond the tread or axially outward from the rim with the flat side face thereof substantially flush with the tread, a shoulder on each tooth for engagement with the flat end of the bracket means when the tooth is in axially outward position to hold the tooth against pivoting, and a slot in each tooth for the bolt means to permit the tooth to be rotated around the corner formed on the bracket means by the flat end thereof.

4. A tractor wheel, comprising in combination, a rim, bracket means standing out from the rim and being flush with the rim tread, ground teeth mounted on the bracket means, each tooth having a flat side face, and bolt means adjustably securing each tooth to each bracket means to extend beyond the tread or axially outward from the rim with the flat side face thereof substantially flush with the tread, said bolt means being disposed parallel to the plane of the wheel rim, and interengaging means on each tooth and bracket to restrain each tooth against rotation upon the bracket when in axially extending position and when in radially extended position including, means upon each tooth, and means in two positions upon the bracket one of which is engaged by the tooth means depending upon the position of the tooth.

WILLIAM H. LEDBETTER.